(No Model.)
C. R. DAVIS.
HARROW ATTACHMENT FOR CULTIVATORS.
No. 352,740. Patented Nov. 16, 1886.
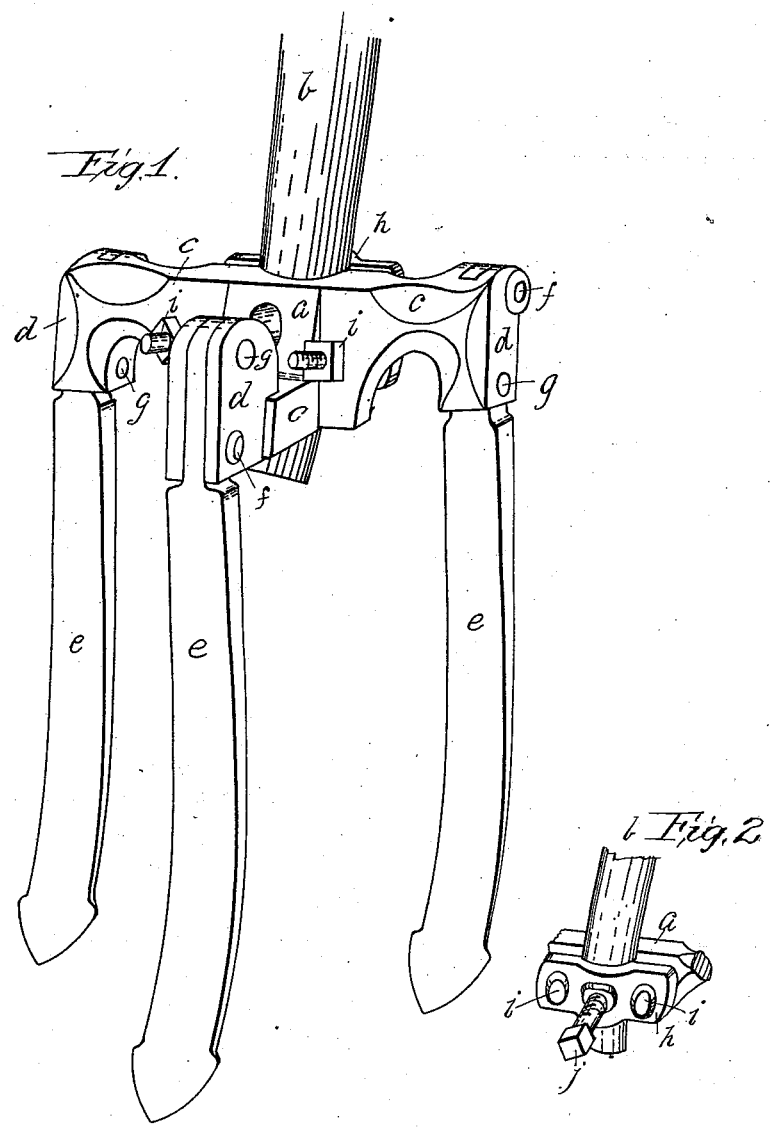
Attest
D. A. Adair.
J. A. Scott.
Inventor
Calvin R. Davis.
By E. E. Sickler
Atty.

UNITED STATES PATENT OFFICE.

CALVIN R. DAVIS, OF INDIANAPOLIS, INDIANA.

HARROW ATTACHMENT FOR CULTIVATORS.

SPECIFICATION forming part of Letters Patent No. 352,740, dated November 16, 1886.

Application filed July 12, 1886. Serial No. 207,829. (No model.)

*To all whom it may concern:*

Be it known that I, CALVIN R. DAVIS, a citizen of the United States, residing at Indianapolis, in the county Marion and State of Indiana, have invented a certain new and useful Improvement in Harrow Attachments for Cultivators, of which the following is a specification.

The object of my improvement is to so construct a harrow attachment that each harrow-tooth may have a break-pin independent of the other, and thus obviate the straining of the frame of the attachment or the cultivator-shank by coming in sudden contact with stationary obstacles in the ground.

My said improvement consists in the combination and arrangement of parts, which will hereinafter be more fully described and claimed.

Referring to the accompanying drawings, which are made a part hereof, Figure 1 is a perspective view of my invention, and Fig. 2 is a detached view showing the manner of securing the attachment to a cultivator-shank.

$a$ is a central frame, adapted to being secured to the shank $b$ of any ordinary cultivator.

$c\ c\ c$ are arms radiating from frame $a$, one forward and two laterally, upon the extremities of which are formed heads $d\ d\ d$. Said heads are adapted to embrace the upper ends of the harrow-teeth $e\ e\ e$. Said teeth are pivoted at their upper ends in said heads by bolts $f\ f\ f$, passed through the head and through the tooth. A hole, $g\ g\ g$, is also made through the head and tooth at a short distance from the pivot, into which is inserted a wooden pin. The forward tooth is pivoted at the bottom of the head, and has the break-pin at the top, thus allowing the upper end of the tooth to move forward out of the head when the point of the tooth strikes any obstacle and the wooden pin is broken. The lateral teeth are pivoted at the top, and have the break-pin at the bottom, of the head, allowing the entire tooth to move backward out of the head under the same circumstances as affect the forward tooth.

In Fig. 2, $a$ is the frame, $b$ the cultivator-shank, and $h$ a cap holding said frame to said shank by means of bolts $i\ i$. This device has been found insufficient to prevent the attachment from turning upon the shank. I therefore raise a boss upon cap $h$, through which I thread a set-screw, $j$, turning it hard against the shank $b$, holding the attachment securely in position.

I must be understood as not limiting myself to any particular form or shape of arms, heads, and teeth, as those may be varied without departing from the spirit of my invention.

What I do claim as my invention, and desire to protect by Letters Patent, is—

The combination, with frame $a$ and shank $b$, of arms $c\ c\ c$, having harrow-teeth $e\ e\ e$, pivotally secured thereon, substantially as shown and described.

CALVIN R. DAVIS.

Witnesses:
JAMES S. SCHOONOVER,
E. E. SICKLER.